(12) United States Patent
Shimono et al.

(10) Patent No.: US 10,744,701 B2
(45) Date of Patent: Aug. 18, 2020

(54) METHOD FOR MOLDING COMPOSITE MATERIAL, JIG FOR MOLDING COMPOSITE MATERIAL, AND COMPOSITE MATERIAL

(71) Applicant: MITSUBISHI HEAVY INDUSTRIES, LTD., Tokyo (JP)

(72) Inventors: Kodai Shimono, Tokyo (JP); Hiroshi Tokutomi, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 15/779,975

(22) PCT Filed: Nov. 2, 2016

(86) PCT No.: PCT/JP2016/082671
§ 371 (c)(1),
(2) Date: May 30, 2018

(87) PCT Pub. No.: WO2017/126189
PCT Pub. Date: Jul. 27, 2017

(65) Prior Publication Data
US 2019/0084217 A1    Mar. 21, 2019

(30) Foreign Application Priority Data
Jan. 22, 2016 (JP) .................. 2016-010911

(51) Int. Cl.
*B29C 53/02* (2006.01)
*B29C 70/44* (2006.01)
(Continued)

(52) U.S. Cl.
CPC ............. *B29C 53/02* (2013.01); *B29C 53/04* (2013.01); *B29C 53/80* (2013.01); *B29C 70/446* (2013.01);
(Continued)

(58) Field of Classification Search
CPC ......... B29C 53/02; B29C 53/04; B29C 53/80; B29C 70/446; B29C 70/388; B29D 99/0003; B29K 2307/04; B29L 2031/7739
(Continued)

(56) References Cited

U.S. PATENT DOCUMENTS 5,648,109 A   7/1997  Gutowski et al.
9,573,301 B2  2/2017  Kline et al.
(Continued)

FOREIGN PATENT DOCUMENTS

CA    3035953 A1    3/2018
CN    105073393 A   11/2015
(Continued)

OTHER PUBLICATIONS

ISR and WO for Japanese Application No. PCT/JP2016/082671 dated Dec. 27, 2016; 11pp.
(Continued)

*Primary Examiner* — Matthew J Daniels
*Assistant Examiner* — Yunju Kim
(74) *Attorney, Agent, or Firm* — Hauptman Ham, LLP (57) ABSTRACT

A method for molding composite material such as a spar formed with a curved corner part is provided with: a first shaping step of shaping a laminate so that the board thickness of the laminate is reduced from the outside of the corner part toward the inside thereof, the laminate having the corner part curved at a first bending angle and comprising fiber sheets laminated to each other; and a second shaping step of curving the corner part of the laminate to form a second bending angle smaller than the first bending angle, and shaping the laminate so that the board thickness of the laminate is reduced from the inside of the corner part toward the outside thereof.

7 Claims, 4 Drawing Sheets

(51) Int. Cl.
    *B29C 53/04*     (2006.01)
    *B29D 99/00*     (2010.01)
    *B29C 53/80*     (2006.01)
    *B29K 307/04*     (2006.01)
    *B29L 31/00*     (2006.01)

(52) U.S. Cl.
    CPC ...... *B29D 99/0003* (2013.01); *B29K 2307/04* (2013.01); *B29L 2031/7739* (2013.01)

(58) Field of Classification Search
    USPC .......................................................... 264/339
    See application file for complete search history.

(56) References Cited

U.S. PATENT DOCUMENTS

| | | | |
|---|---|---|---|
| 9,782,937 B1* | 10/2017 | Modin | B29C 70/388 |
| 10,307,974 B2 | 6/2019 | Kline et al. | |
| 2006/0249883 A1 | 11/2006 | Oguma et al. | |
| 2007/0194491 A1 | 8/2007 | Krogager et al. | |
| 2014/0284836 A1 | 9/2014 | Kline et al. | |
| 2014/0291889 A1* | 10/2014 | Murai | B29C 43/006 |
| | | | 264/257 |
| 2015/0053332 A1 | 2/2015 | Cano Cediel et al. | |
| 2017/0087782 A1 | 3/2017 | Kline et al. | |
| 2019/0210306 A1 | 7/2019 | Tokutomi | |

FOREIGN PATENT DOCUMENTS

| | | |
|---|---|---|
| JP | 2006312260 A | 11/2006 |
| JP | 2007015351 A | 1/2007 |
| JP | 2008230020 A | 10/2008 |
| JP | 2010120167 A | 6/2010 |
| JP | 2011083975 A | 4/2011 |
| WO | 2017022667 A1 | 2/2017 |
| WO | 2018047869 A1 | 3/2018 |

OTHER PUBLICATIONS

Extended European Search Report for European Application No. 16886428 dated Nov. 16, 2018; 6pp.
Office Action for Canadian Application No. 3006425 dated Apr. 15, 2019; 5pp.
Office Action for Chinese Application No. 201680070073.5 dated Aug. 12, 2019; 25pp.
Examiners Report and Examination Search Report for Canadian Application No. 3,035,953 dated Apr. 9, 2020; 6pp.

* cited by examiner

METHOD FOR MOLDING COMPOSITE MATERIAL, JIG FOR MOLDING COMPOSITE MATERIAL, AND COMPOSITE MATERIAL

RELATED APPLICATIONS

The present application is a National Phase of PCT/JP2016/082671, filed Nov. 2, 2016, and claims priority based on Japanese Patent Application No. 2016-010911, filed Jan. 22, 2016.

TECHNICAL FIELD

The present invention relates to a method for molding a composite material having a curved corner part, a composite material molding jig, and a composite material.

BACKGROUND ART

Known in the related art as a method for molding a composite material having a curved corner part is a method for manufacturing a preform molded by a reinforced fiber laminate being brought into close contact with a shaping mold as a male mold (refer to, for example, PTL 1). The male mold used for this manufacturing method has an upper surface, a shoulder, and a side surface. According to this manufacturing method, pushing pressure is sequentially applied from the shoulder to the side surface of the reinforced fiber laminate and then the pushing pressure is sequentially applied from the upper surface to the shoulder of the reinforced fiber laminate when the pushing pressure is sequentially applied from the upper surface to the side surface of the reinforced fiber laminate so that the reinforced fiber laminate is brought into close contact with the male mold without wrinkles.

CITATION LIST

Patent Literature

[PTL 1] Japanese Unexamined Patent Application Publication No. 2010-120167

SUMMARY OF INVENTION

Technical Problem

By the manufacturing method disclosed in PTL 1, the upper surface, the shoulder, and the side surface are formed by both sides of the reinforced fiber laminate, which is a flat plate, being curved. Then, the pushing pressure is applied from the outside of the reinforced fiber laminate with respect to the shoulder of the reinforced fiber laminate formed by the curving. Once the pushing pressure is applied from the outside of the reinforced fiber laminate, the thickness of the shoulder of the reinforced fiber laminate is reduced. At this time, the thickness-direction outside circumference of the reinforced fiber laminate is shortened. Once the thickness-direction outside circumference is shortened, a surplus of the reinforced fiber laminate is generated to the same extent as the shortening, and wrinkles are likely to be generated outside the shoulder of the reinforced fiber laminate due to the surplus. As a result, occurrence of imperfect molding such as wrinkles becomes less likely to be suppressed.

An object of the present invention is to provide a composite material molding method, a composite material molding jig, and a composite material with which occurrence of imperfect molding of a curved corner part can be suitably suppressed.

Solution to Problem

A composite material molding method according to the present invention is a method for molding a composite material having a curved corner part, the composite material molding method including a first shaping step of shaping a laminate having the corner part curved at a first bending angle and fiber sheets laminated such that a plate thickness of the laminate is reduced from an outside toward an inside of the corner part and a second shaping step of shaping the laminate such that the plate thickness of the laminate is reduced by curving the corner part of the laminate to be a second bending angle smaller than the first bending angle.

According to this configuration, in the first shaping step, the plate thickness is reduced from the outside toward the inside of the laminate with respect to the laminate having the corner part forming the first bending angle, and thus the laminate can be densified and the outside circumference of the corner part is shortened. Then, in the second shaping step, the outside circumference of the corner part can be stretched by the laminate being curved at the second bending angle. In this manner, the surplus part of the laminate generated by the outside circumference of the corner part being shortened in the first shaping step can be offset by the outside circumference of the corner part being stretched and the surplus part of the laminate being prolonged in the second shaping step. Therefore, generation of wrinkles outside the corner part of the laminate can be suitably suppressed and occurrence of imperfect molding of the corner part can be suppressed. In the first shaping step, the laminate is shaped by a male mold with which the inside of the corner part is in contact being used. In the second shaping step, the laminate is shaped by the male mold or a female mold with which the outside of the corner part is in contact being appropriately used. The fiber sheet may be a dried one or may be a prepreg impregnated with resin. In the first shaping step, the corner part may be formed by the flat plate-shaped laminate in which the fiber sheets are laminated being curved at the first bending angle or the laminate having the corner part may be formed by the fiber sheets being laminated while the fiber sheets are curved at the first bending angle.

Another composite material molding method according to the present invention is a method for molding a composite material having a curved corner part, the composite material molding method including a first shaping step of shaping a laminate having the corner part curved at a first bending angle and fiber sheets laminated such that a plate thickness of the laminate is reduced and a second shaping step of shaping the laminate such that the plate thickness of the laminate is reduced from an inside toward an outside of the corner part by curving the corner part of the laminate to be a second bending angle smaller than the first bending angle.

According to this configuration, the inside circumference of the corner part is lengthened once the plate thickness is reduced from the outside toward the inside of the laminate with respect to the laminate having the corner part forming the second bending angle in the second shaping step. In this case, the laminate stretches inside the corner part, and thus densification of the corner part becomes difficult and the fiber content of the corner part is reduced. Accordingly, in the second shaping step, the inside of the corner part is shrunk and a surplus part is generated in advance inside the corner part by the laminate being curved to reach the second bending angle from the first bending angle. Then, in the second shaping step, the inside circumference of the corner part can be suitably stretched, because of the surplus part of the laminate, when the plate thickness of the laminate is reduced from the inside toward the outside of the corner part. In this manner, stretching of the laminate attributable to an increase in the inside circumference of the corner part can be suppressed in the second shaping step by the inside circumference of the corner part being lengthened in a state where the surplus part of the laminate is generated in advance inside the corner part. Accordingly, stretching of the laminate inside the corner part of the laminate can be suppressed, and thus densification of the corner part can be suitably performed and occurrence of imperfect molding of the corner part can be suppressed. In the first shaping step, the laminate is shaped by a male mold with which the outside of the corner part is in contact or a female mold with which the outside of the corner part is in contact being appropriately used. In the second shaping step, the laminate is shaped by the female mold being used. The fiber sheet may be a dried one or may be a prepreg impregnated with resin. In the first shaping step, the corner part may be formed by the flat plate-shaped laminate in which the fiber sheets are laminated being curved at the first bending angle or the laminate having the corner part may be formed by the fiber sheets being laminated while the fiber sheets are curved at the first bending angle.

Preferably, the laminate is shaped such that the plate thickness of the laminate is reduced from the outside toward the inside of the corner part by using a male mold with which the inside of the corner part is in contact in the first shaping step and the laminate is shaped such that the plate thickness of the laminate is reduced from the inside toward the outside of the corner part by using a female mold with which the outside of the corner part is in contact in the second shaping step.

According to this configuration, in the first shaping step, the male mold is in contact with the inside of the corner part, and thus a change in the circumference of the inside of the corner part can be suppressed. Accordingly, in the first shaping step, the laminate can be suitably shaped such that the plate thickness of the laminate is reduced from the outside toward the inside of the corner part. In addition, in the second shaping step, the female mold is in contact with the outside of the corner part, and thus a change in the circumference of the outside of the corner part can be suppressed. Accordingly, in the second shaping step, the laminate can be suitably shaped such that the plate thickness of the laminate is reduced from the inside toward the outside of the corner part. Accordingly, in the second shaping step, the outside circumference of the corner part can be stretched by the laminate being curved to reach the second bending angle from the first bending angle and, at the same time, a surplus part can be generated inside the corner part by the inside of the corner part being shrunk. Then, in the second shaping step, the inside circumference of the corner part can be stretched by the plate thickness of the laminate being reduced from the inside toward the outside of the corner part. In this manner, generation of wrinkles outside the corner part of the laminate can be suitably suppressed by the outside circumference of the corner part being stretched by the corner part being curved. In addition, stretching of the laminate can be suppressed and densification of the corner part can be suitably performed by the inside circumference of the corner part being stretched by the plate thickness of the laminate being reduced and the surplus part being generated inside the corner part by the corner part being curved at the same time.

Preferably, the composite material is a spar in which the corner part forms a right angle, the second bending angle is a right angle, and the first bending angle is an obtuse angle exceeding a right angle.

According to this configuration, the composite material in which occurrence of imperfect molding of the corner part is suitably suppressed can be molded in a case where the spar in which the corner part forms a right angle is molded.

A molding jig according to the present invention is a jig for molding a composite material having a curved corner part, the molding jig including a first molding tool for molding a laminate having the corner part curved at a first bending angle and fiber sheets laminated and shaping the laminate such that a plate thickness of the laminate is reduced from an outside toward an inside of the corner part and a second molding tool for shaping the laminate such that the plate thickness of the laminate is reduced by curving the corner part of the laminate to be a second bending angle smaller than the first bending angle.

According to this configuration, the composite material in which generation of wrinkles at the corner part is suitably suppressed can be molded by the first molding tool and the second molding tool being used.

Another molding jig according to the present invention is a jig for molding a composite material having a curved corner part, the molding jig including a first molding tool for molding a laminate having the corner part curved at a first bending angle and fiber sheets laminated and shaping the laminate such that a plate thickness of the laminate is reduced and a second molding tool for shaping the laminate such that the plate thickness of the laminate is reduced from an inside toward an outside of the corner part by curving the corner part of the laminate to be a second bending angle smaller than the first bending angle.

According to this configuration, the composite material in which the corner part is suitably densified can be molded by the first molding tool and the second molding tool being used.

Preferably, the first molding tool is a male mold with which the inside of the corner part is in contact and the second molding tool is a female mold with which the outside of the corner part is in contact.

According to this configuration, the composite material in which generation of wrinkles at the corner part is suitably suppressed and the corner part is suitably densified can be molded.

A composite material according to the present invention includes a curved corner part and a linear portion continuous to the corner part, in which a thickness of the corner part is thicker than the linear portion and a fiber content of the corner part is lower than a fiber content of the linear portion.

According to this configuration, the composite material in which occurrence of imperfect molding of the corner part is suitably suppressed can be obtained. In addition, in a case where a material causing a densification of approximately 10% is used during the molding, a densification of at least 7% is also possible for the corner part, the difference between the fiber content of the linear portion and the fiber content of the corner part can be equal to or less than 3% and, the fiber content of the corner part and the fiber content of the linear portion can be uniformized.

DESCRIPTION OF EMBODIMENTS

Hereinafter, embodiments according to the present invention will be described in detail with reference to accompanying drawings. The invention is not limited by the embodiments. In addition, elements constituting the following embodiments include those that can be replaced and are easily replaced by those skilled in the art or those that are substantially identical. Furthermore, the elements described below can be appropriately combined and, in a case where there are two or more embodiments, each embodiment can be combined as well.

First Embodiment

A method for molding a composite material 1 according to a first embodiment is a method for molding the composite material 1 constituting, for example, an aircraft fuselage. The composite material 1 is, for example, a spar 10 illustrated in FIG. 1. Although application of the present invention to the composite material 1 illustrated in FIG. 1 will be described in the present embodiment, the present invention is not limited to the composite material 1.

Figure 1:
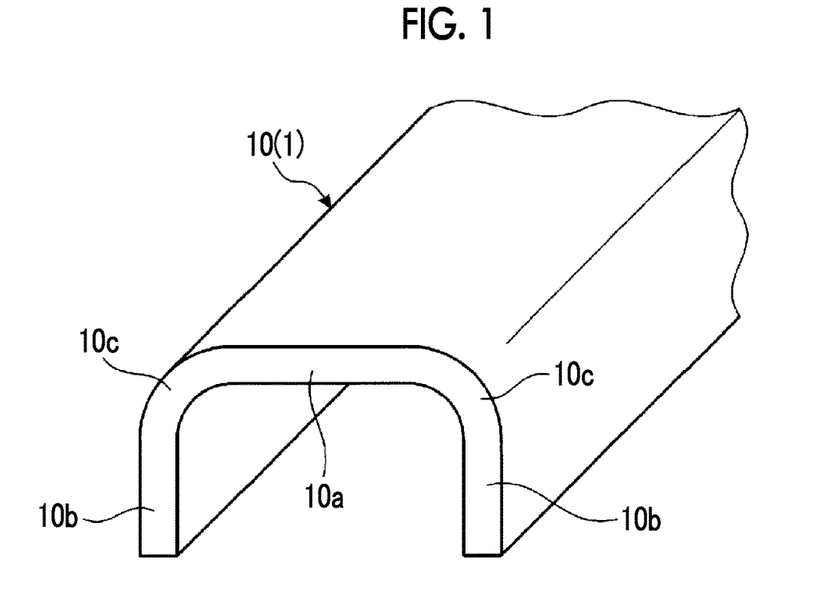
FIG. 1 is a perspective view illustrating a spar as an example of a composite material molded by a composite material molding method according to a first embodiment.
Figure 2:
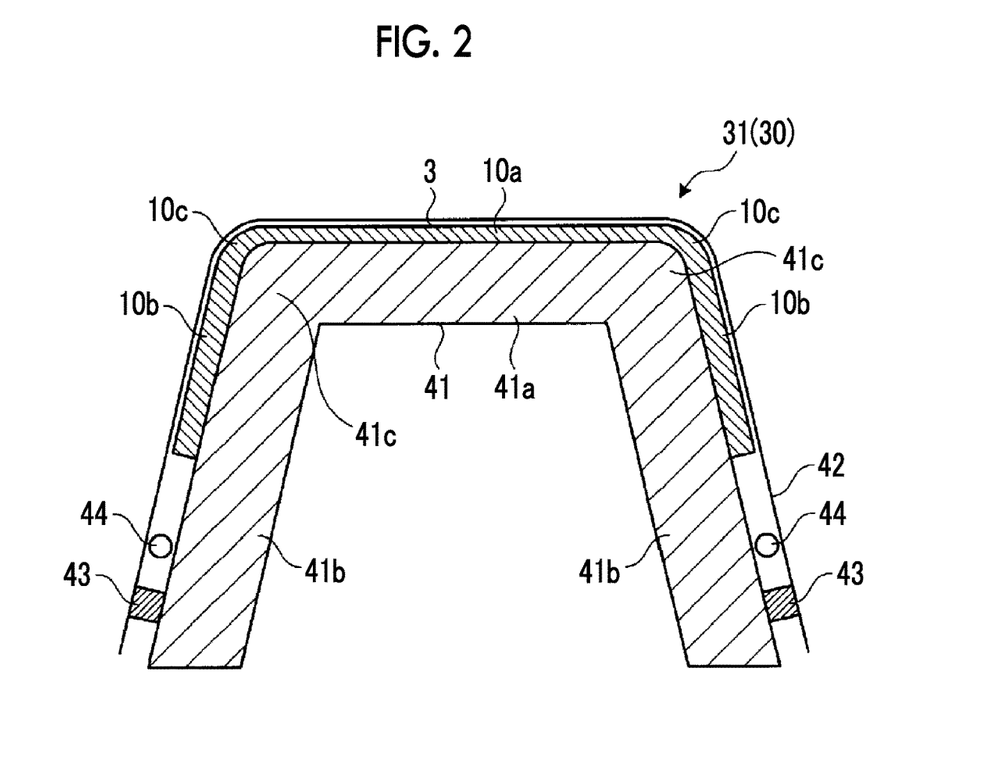
FIG. 2 is a schematic diagram illustrating a first molding tool used for the composite material molding method according to the first embodiment.
Figure 3:
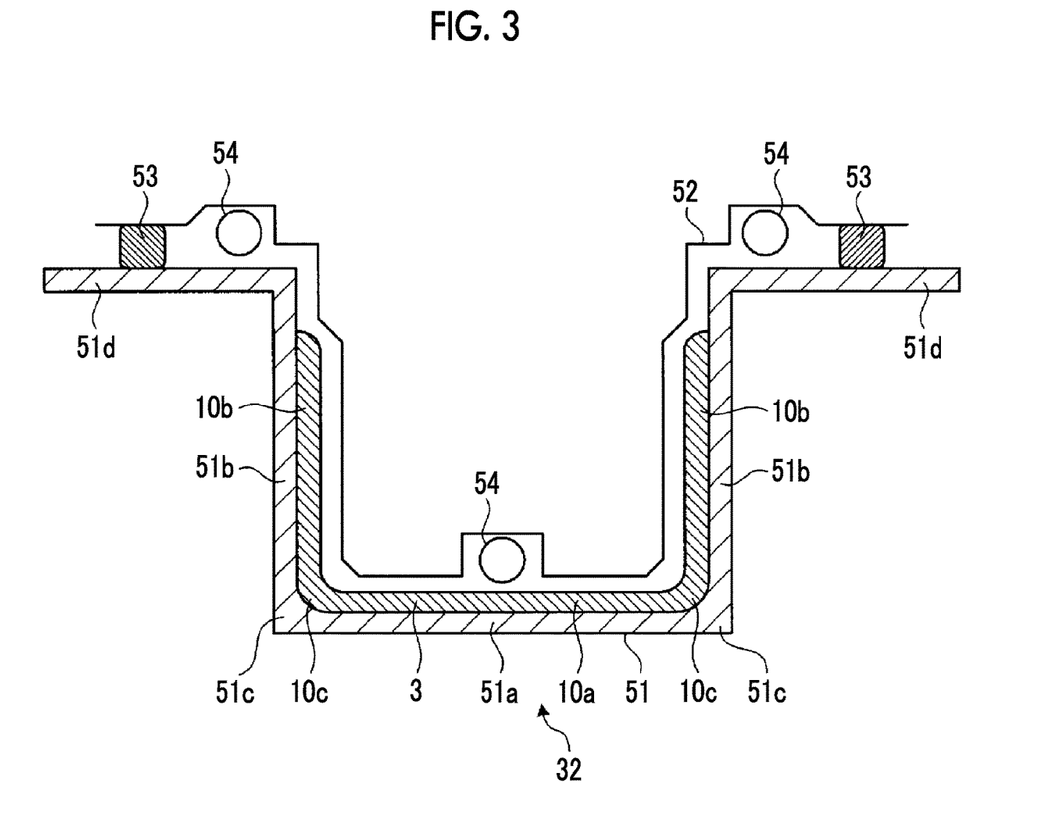
FIG. 3 is a schematic diagram illustrating a second molding tool used for the composite material molding method according to the first embodiment.
Figure 4:
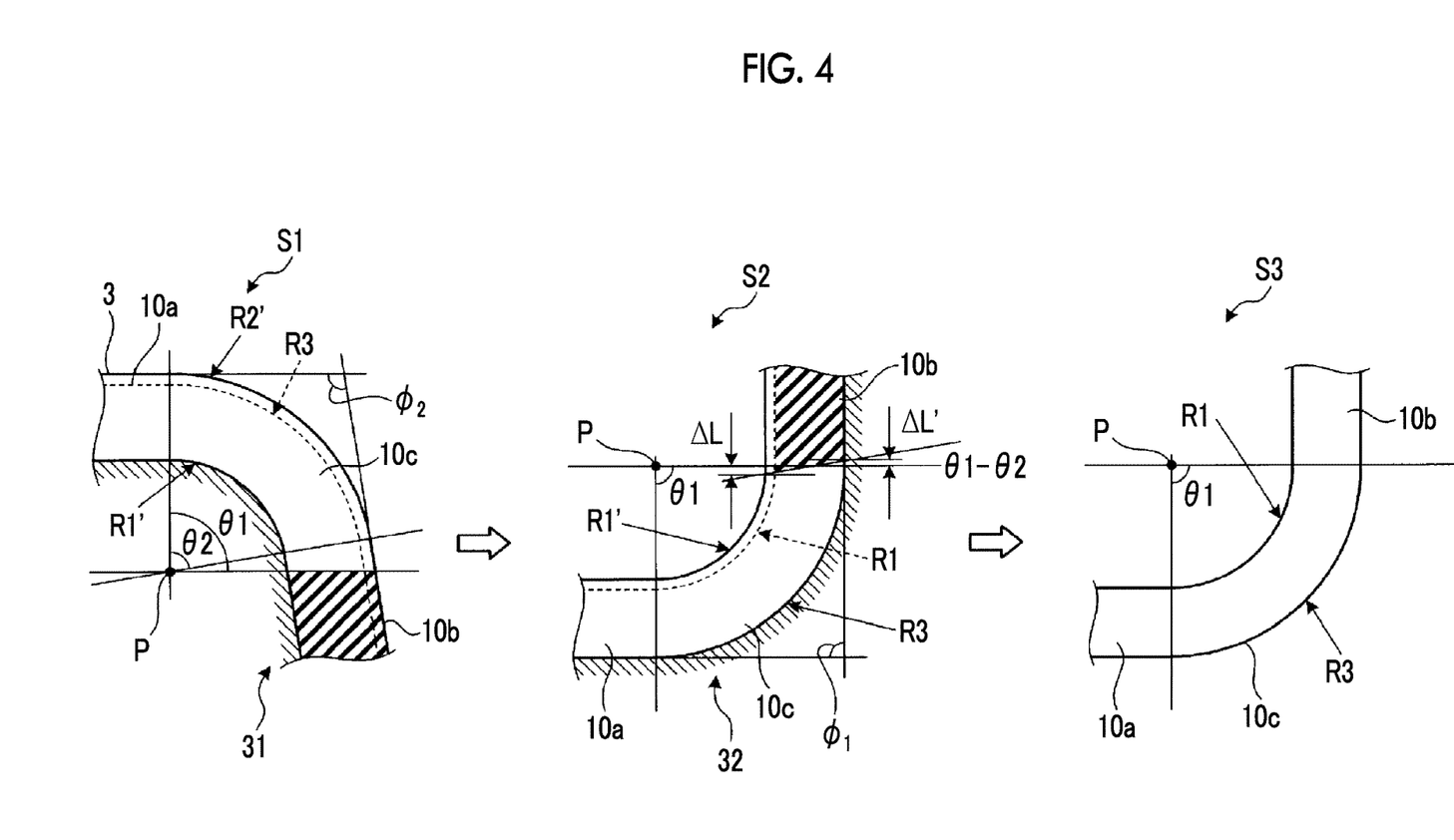
FIG. 4 is an explanatory diagram relating to the composite material molding method according to the first embodiment.

FIG. 1 is a perspective view illustrating the spar as an example of the composite material that is molded by the composite material molding method according to the first embodiment. FIG. 2 is a schematic diagram illustrating a first molding tool used for the composite material molding method according to the first embodiment. FIG. 3 is a schematic diagram illustrating a second molding tool used for the composite material molding method according to the first embodiment. FIG. 4 is an explanatory diagram relating to the composite material molding method according to the first embodiment.

The composite material 1 molded by the molding method will be described with reference to FIG. 1 prior to the description of the method for molding the composite material 1. The composite material 1 illustrated in FIG. 1 is configured by carbon fiber reinforced plastic (CFRP) being used. The composite material 1 is molded by a laminate 3 in which fiber sheets folded on both sides are laminated being molded and then the folded laminate 3 being impregnated with resin and cured. Resin having an adhesion or cohesion function is interposed between the fiber sheet layers of the laminate 3.

In the spar 10 illustrated in FIG. 1, a pair of corner parts 10c is formed in the laminate 3 by both width-direction sides of the spar 10 being curved. In other words, the spar 10 has a width-direction central portion 10a, a pair of side surface portions 10b formed on both width-direction sides of the central portion 10a and perpendicular to the central portion 10a, and the pair of corner parts 10c formed between the central portion 10a and the pair of side surface portions 10b. At this time, the central portion 10a and the pair of side surface portions 10b are linear portions that are not curved.

In this manner, in the spar 10 illustrated in FIG. 1, the laminate 3 is two-dimensionally curved and the curved corner parts 10c are formed by the pair of side surface portions 10b being curved with respect to the central portion 10a.

The spar 10 illustrated in FIG. 1 is molded by a predetermined molding jig 30 being used. The molding jig has a first molding tool 31 molding the laminate 3 having the corner part 10c curved at a first bending angle $\varphi_2$ and a second molding tool 32 curving the corner part 10c of the laminate 3 to form a second bending angle $\varphi_1$ smaller than the first bending angle $\varphi_2$. The first bending angle $\varphi_2$ is an angle that is formed by the outside surface of the central portion 10a and the outside surface of the side surface portion 10b and is, for example, an obtuse angle exceeding 90°. The second bending angle $\varphi_1$ is an angle that is formed by the outside surface of the central portion 10a and the outside surface of the side surface portion 10b and is, for example, an angle of 90° (right angle).

As illustrated in FIG. 2, the first molding tool 31 is a male mold with which the inside of the corner part 10c is in contact. The first molding tool 31 is to mold the laminate 3 having the corner part 10c curved at the first bending angle $\varphi_2$ and densify and shape the laminate such that the plate thickness of the laminate 3 is reduced from the outside toward the inside of the corner part 10c. The first molding tool 31 may mold the corner part 10c by curving the flat plate-shaped laminate 3 in which the fiber sheets are laminated at the first bending angle $\varphi_2$ and may mold the laminate 3 having the corner part 10c by laminating the fiber sheets while curving the fiber sheets at the first bending angle $\varphi_2$.

The first molding tool 31 has a male mold material 41. The male mold material 41 has an upper surface portion 41a, a pair of side surface portions 41b formed on both width-direction sides of the upper surface portion 41a and forming the first bending angle $\varphi_2$ with respect to the upper surface portion 41a, and a pair of corner parts 41c formed between the upper surface portion 41a and the pair of side surface portions 41b.

The inside of the central portion 10a of the laminate 3 is in contact with the outside surface of the upper surface portion 41a. The insides of the pair of side surface portions 41b of the laminate 3 are in contact with the outside surfaces of the pair of side surface portions 41b. The insides of the pair of corner parts 10c of the laminate 3 are in contact with the outside surfaces of the pair of corner parts 41c.

The male mold material 41 is covered with a bagging film 42. The bagging film 42 covers the laminate 3 installed on the male mold material 41 and the inside of the bagging film 42 is sealed in an airtight manner by a seal material 43 being disposed between the bagging film and the male mold material 41. The laminate 3 is densified by the internal atmosphere of the bagging film 42 sealed in an airtight manner being vacuum-drawn via a suction port 44 and heated by a heating device (not illustrated). At this time, the laminate 3 is heated by the heating device, and thus the resin between the fiber sheet layers of the laminate 3 melts. Accordingly, the shape of the vacuum-released and densified laminate 3 is held by the resin between the layers, and thus returning to the pre-densification shape of the laminate 3 can be suppressed.

In this manner, the male mold material 41 is in contact with the inside of the corner part 10c of the laminate 3, and thus a change in the circumference of the inside of the corner part 10c is suppressed. In the first molding tool 31, the laminate 3 is shaped such that the plate thickness of the laminate 3 is reduced from the outside toward the inside of the corner part 10c.

As illustrated in FIG. 3, the second molding tool 32 is a female mold with which the outside of the corner part 10c is in contact. The second molding tool 32 forms the corner part 10c by curving the laminate 3 at the second bending angle $\varphi_1$ smaller than the first bending angle $\varphi_2$ and shapes the laminate 3 such that the plate thickness of the laminate 3 is reduced from the inside toward the outside of the corner part 10c.

The second molding tool 32 has a female mold material 51. The female mold material 51 has a bottom surface portion 51a, a pair of side surface portions 51b formed on both width-direction sides of the bottom surface portion 51a and forming the second bending angle with respect to (perpendicular to) the bottom surface portion 51a, a pair of corner parts 51c formed between the bottom surface portion 51a and the pair of side surface portions 51b, and a pair of flange portions 51d protruding to the outside from the upper portions of the pair of side surface portions 51b.

The outside of the central portion 10a of the folded laminate 3 is in contact with the inside surface of the bottom surface portion 51a. The outsides of the pair of side surface portions 10b of the folded laminate 3 are in contact with the inside surfaces of the pair of side surface portions 51b. The outsides of the pair of corner parts 10c of the folded laminate 3 are in contact with the inside surfaces of the pair of corner parts 51c.

The female mold material 51 is covered with a bagging film 52. The bagging film 52 covers the laminate 3 installed on the female mold material 51 and the inside of the bagging film 52 is sealed in an airtight manner by a seal material 53 being disposed between the bagging film and the female mold material 51. The internal atmosphere of the bagging film 52 sealed in an airtight manner is filled with a resin material and vacuum-drawn via a suction port 54 at the same time and is heated by a heating device (not illustrated). Then, the resin material is thermally cured and the spar 10 is molded.

In this manner, the female mold material 51 is in contact with the outside of the corner part 10c of the laminate 3, and thus a change in the circumference of the outside of the corner part 10c is suppressed. Accordingly, in the second molding tool 32, the laminate 3 is shaped such that the plate thickness of the laminate 3 is reduced from the inside toward the outside of the corner part 10c.

The composite material molding method will be described below with reference to FIG. 4. This composite material molding method is a molding method using a fiber sheet in a dry state and vacuum assisted resin transfer molding (VaRTM) molding, resin transfer molding (RTM) molding, infusion molding, and so on are applicable. In the following description, a case where the spar 10 illustrated in FIG. 1 is molded will be described.

As illustrated in FIG. 4, in this molding method, the laminate 3 having the corner part 10c curved at the first bending angle $\varphi_2$ is molded first in accordance with the shape of the male mold material 41 of the first molding tool 31 (Step S1: first shaping step). Specifically, in the first shaping step S1, the laminate 3 is molded in an angle range $\theta 2$ such that the circumference of the inside of the corner part 10c forms a predetermined curvature radius R1' about a center point P. In other words, the part of the angle range $\theta 2$ curved at the predetermined curvature radius R1' is the corner part 10c of the laminate 3. The angle range $\theta 2$ is, for example, 80°.

In addition, in the first shaping step S1, vacuum heating and densification of the laminate 3 are performed such that the plate thickness of the laminate 3 is reduced from the outside toward the inside of the corner part 10c. Specifically, in the first shaping step S1, the laminate 3 is molded in a plate thickness-reduced manner such that the circumference of the outside of the corner part 10c ranges from a predetermined curvature radius R2' to a predetermined curvature radius R3 about the center point P. The curvature radius R3 is a curvature radius shorter than the curvature radius R2'.

Subsequently, the corner part 10c of the laminate 3 is curved, such that the second bending angle $\varphi_1$ (right angle) smaller than the first bending angle $\varphi_2$ is formed, in accordance with the shape of the female mold material 51 of the second molding tool 32 by the laminate 3 forming the first bending angle $\varphi_2$ being fitted into the female mold material 51 of the second molding tool 32 (Step S2: second shaping step). Specifically, in the second shaping step S2, the laminate 3 is curved in an angle range $\theta 1$, which is wider than the angle range $\theta 2$, such that the circumference of the inside of the corner part 10c forms the predetermined curvature radius R1' about the center point P. In other words, the part of the angle range $\theta 1$ curved at the predetermined curvature radius R1' is the corner part 10c of the laminate 3. The angle range $\theta 1$ is, for example, 90°.

In addition, in the second shaping step S2, vacuum heating and densification of the laminate 3 are performed such that the plate thickness of the laminate 3 is reduced from the inside toward the outside of the corner part 10c. Specifically, in the second shaping step S2, the laminate 3 is molded in a plate thickness-reduced manner such that the circumference of the inside of the corner part 10c ranges from the predetermined curvature radius R1' to a predetermined curvature radius R1 about the center point P. The curvature radius R1 is a curvature radius longer than the curvature radius R1'.

Then, in the second shaping step S2, the spar 10 is molded by resin being injected into the laminate 3 and the resin being thermally cured under a high-temperature and high-pressure environment at the same time (Step S3). The molded spar 10 has a shape in which the curvature radius of the inside circumference is R1, the curvature radius of the outside circumference is R3, and the bending angle that is formed by the central portion 10a and the side surface portion 10b is a right angle.

The outside circumference of the corner part 10c of the laminate 3, which changes in the first shaping step S1 and the second shaping step S2, will be described below. In a case where the plate thickness of the laminate 3 changes from the curvature radius R2' to the curvature radius R3 in the first shaping step S1, the difference in the outside circumference of the laminate 3 before and after the plate thickness change is "$2\pi(R2'-R3) \times (\theta 2/360°)$ ... (1)". In other words, the outside circumference of the laminate 3 is shortened by the plate thickness of the laminate 3 being reduced, and thus a surplus is generated.

In a case where the bending angle changes in the subsequent second shaping step S2, the circumference difference between the inside and the outside of the laminate 3 attributable to the angle change is "$((R3-R1)/2) \times \tan(\theta 2 - \theta 1)$ ... (2)". In other words, the outside circumference of the laminate 3 is stretched by the angle range of the laminate 3 changing from the angle range $\theta 2$ to the angle range $\theta 1$. Accordingly, some of the surpluses is offset by fiber elongation of the outside circumference. In other words, by Formula (2) being subtracted from Formula (1), the circumference difference as the final surplus becomes ΔL' (=Formula (1)−Formula (2)).

Accordingly, in the outside circumference of the corner part $10c$ of the laminate 3, the surplus outside the corner part $10c$ can be prolonged by the surplus generated outside the corner part $10c$ of the laminate 3 in first shaping step S1 being curved from the first bending angle $\varphi_2$ to the second bending angle $\varphi_1$ in the second shaping step S2.

The inside circumference of the corner part $10c$ of the laminate 3, which changes in the first shaping step S1 and the second shaping step S2, will be described below. In a case where the bending angle changes in the second shaping step S2, the circumference difference between the inside and the outside of the laminate 3 attributable to the angle change is "((R3−R1)/2)×tan(θ2−θ1) . . . (2)" In other words, the inside circumference of the laminate 3 is shortened by the angle range of the laminate 3 changing from the angle range θ2 to the angle range θ1, and thus a surplus is generated.

In a case where the plate thickness of the laminate 3 changes from the curvature radius R1' to the curvature radius R1 in the subsequent second shaping step S2, the difference in the inside circumference of the laminate 3 before and after the plate thickness change is "2π(R1−R1')×(θ1/360°) . . . (3)". In other words, the inside circumference of the laminate 3 is stretched by the plate thickness of the laminate 3 being reduced. Accordingly, some of the surpluses is offset by fiber elongation of the inside circumference. In other words, by Formula (2) being subtracted from Formula (3), the circumference difference as the final fiber elongation becomes ΔL (=Formula (3)−Formula (2)).

Accordingly, in the inside circumference of the corner part $10c$ of the laminate 3, fiber stretching inside the corner part $10c$ can be suppressed, even when the inside circumference of the corner part $10c$ is stretched in the second shaping step S2, by curving being performed from the first bending angle $\varphi_2$ to the second bending angle $\varphi_1$ in the second shaping step S2 and a surplus being generated in advance inside the corner part $10c$ of the laminate 3.

The spar 10 molded in this manner is formed such that the corner part $10c$ is slightly thicker than the central portion $10a$ and the pair of side surface portions $10b$, which are linear portions. This is because the fiber inside the corner part $10c$ slightly stretches although the inside circumference of the corner part $10c$ should be stretched by ΔL for the corner part $10c$ of the laminate 3 to be densified. Accordingly, the fiber content of the corner part $10c$ is lower than the fiber content of the central portion $10a$ and the pair of side surface portions $10b$. In a case where a material causing densification to the extent that the thickness of the central portion $10a$ and the pair of side surface portions $10b$ is reduced by approximately 10% is used during the molding, a densification of at least 7% is also possible for the corner part $10c$. Therefore, the difference between the fiber content of the corner part $10c$ and the fiber content of the central portion $10a$ and the pair of side surface portions $10b$ can be equal to or less than 3% and, more preferably, can be approximately 1%.

As described above, according to the first embodiment, the plate thickness is reduced from the outside toward the inside of the laminate 3 with respect to the laminate 3 having the corner part $10c$ forming the first bending angle $\varphi_2$ in the first shaping step S1, and thus the laminate 3 can be densified and the outside circumference of the corner part $10c$ is shortened. Then, in the second shaping step S2, the outside circumference of the corner part $10c$ can be stretched by the laminate 3 being curved at the second bending angle $\varphi_1$. In this manner, the surplus part of the laminate 3 generated by the outside circumference of the corner part $10c$ being shortened in the first shaping step S1 can be offset by the outside circumference of the corner part $10c$ being stretched and the surplus part of the laminate 3 being prolonged in the second shaping step S2. Therefore, generation of wrinkles outside the corner part $10c$ of the laminate 3 can be suitably suppressed and occurrence of imperfect molding of the corner part $10c$ can be suppressed.

In addition, according to the first embodiment, a surplus part can be generated in advance inside the corner part $10c$ by the laminate 3 being curved to reach the second bending angle $\varphi_1$ from the first bending angle $\varphi_2$ in the second shaping step S2. In the second shaping step S2, the inside circumference of the corner part $10c$ can be suitably stretched, because of the surplus part, when the plate thickness of the laminate 3 is reduced from the inside toward the outside of the corner part $10c$. Accordingly, fiber stretching inside the corner part $10c$ of the laminate 3 can be suppressed, densification of the corner part $10c$ can be suitably performed, and thus occurrence of imperfect molding of the corner part $10c$ can be suppressed.

In addition, according to the first embodiment, the male mold material 41 is in contact with the inside of the corner part $10c$ in the first shaping step S1 by the first molding tool 31 being used, and thus a change in the circumference of the inside of the corner part $10c$ can be suppressed. Accordingly, in the first shaping step S1, the laminate 3 can be suitably shaped such that the plate thickness of the laminate 3 is reduced from the outside toward the inside of the corner part $10c$. In addition, in the second shaping step S2, the female mold material 51 is in contact with the outside of the corner part $10c$, and thus a change in the circumference of the outside of the corner part $10c$ can be suppressed. Accordingly, in the second shaping step S2, the laminate 3 can be suitably shaped such that the plate thickness of the laminate 3 is reduced from the inside toward the outside of the corner part $10c$. Accordingly, the outside circumference of the corner part $10c$ can be suitably stretched and generation of wrinkles outside the corner part $10c$ of the laminate 3 can be suitably suppressed. In addition, the inside circumference of the corner part $10c$ can be suitably stretched by the plate thickness of the laminate 3 being reduced while a surplus part is generated inside the corner part $10c$ by the corner part $10c$ being curved, and thus stretching of the laminate 3 can be suppressed and densification of the corner part $10c$ can be suitably performed.

In addition, according to the first embodiment, the spar 10 in which occurrence of imperfect molding of the corner part $10c$ is suitably suppressed can be molded even in a case where a spar in which the bending angle of the corner part $10c$ is a right angle is molded.

In addition, according to the first embodiment, the spar 10 in which occurrence of imperfect molding of the corner part $10c$ is suitably suppressed can be provided. In addition, the difference between the fiber content of the corner part $10c$ and the fiber content of the central portion $10a$ and the pair of side surface portions $10b$ can be equal to or less than 3%, and thus the fiber content of the spar 10 as a whole can be uniformized.

In the first embodiment, the laminate 3 is formed by a carbon fiber sheet in a dry state being used. However, the fiber sheet is not limited to a carbon fiber and may also be a fiber sheet of another material such as a glass fiber and an aramid fiber. In addition, a prepreg in which a fiber sheet is impregnated with resin in advance may also be used. In this case, it is preferable that the filling with the resin material is performed to a large extent in the second shaping step S2 and the filling amount is adjusted through appropriate resin material discharge during the molding.

In the first embodiment, the male mold material 41 is used in the first shaping step S1 and the female mold material 51 is used in the second shaping step S2. However, the present invention is not particularly limited thereto. Alternatively, a molding tool of the same male mold or female mold may be used in the first shaping step S1 and the second shaping step S2.

In the description of the first embodiment, the composite material 1 is applied to the spar 10 in which the corner part 10c forms a right angle. However, the applied composite material 1 is not particularly limited. For example, even in the case of the spar 10, the corner part 10c may also range from 80° to 110° or the application may also be to a Z type stringer in which the corner part 10c has approximately 45°. Even in the case of a composite material with the corner part 10c having 45°, the second bending angle $\varphi_1$ may be an angle smaller than the first bending angle $\varphi_2$ and the first bending angle $\varphi_2$ may not be an obtuse angle and the second bending angle $\varphi_1$ is equal to or less than a right angle.

Second Embodiment

Figure 5:
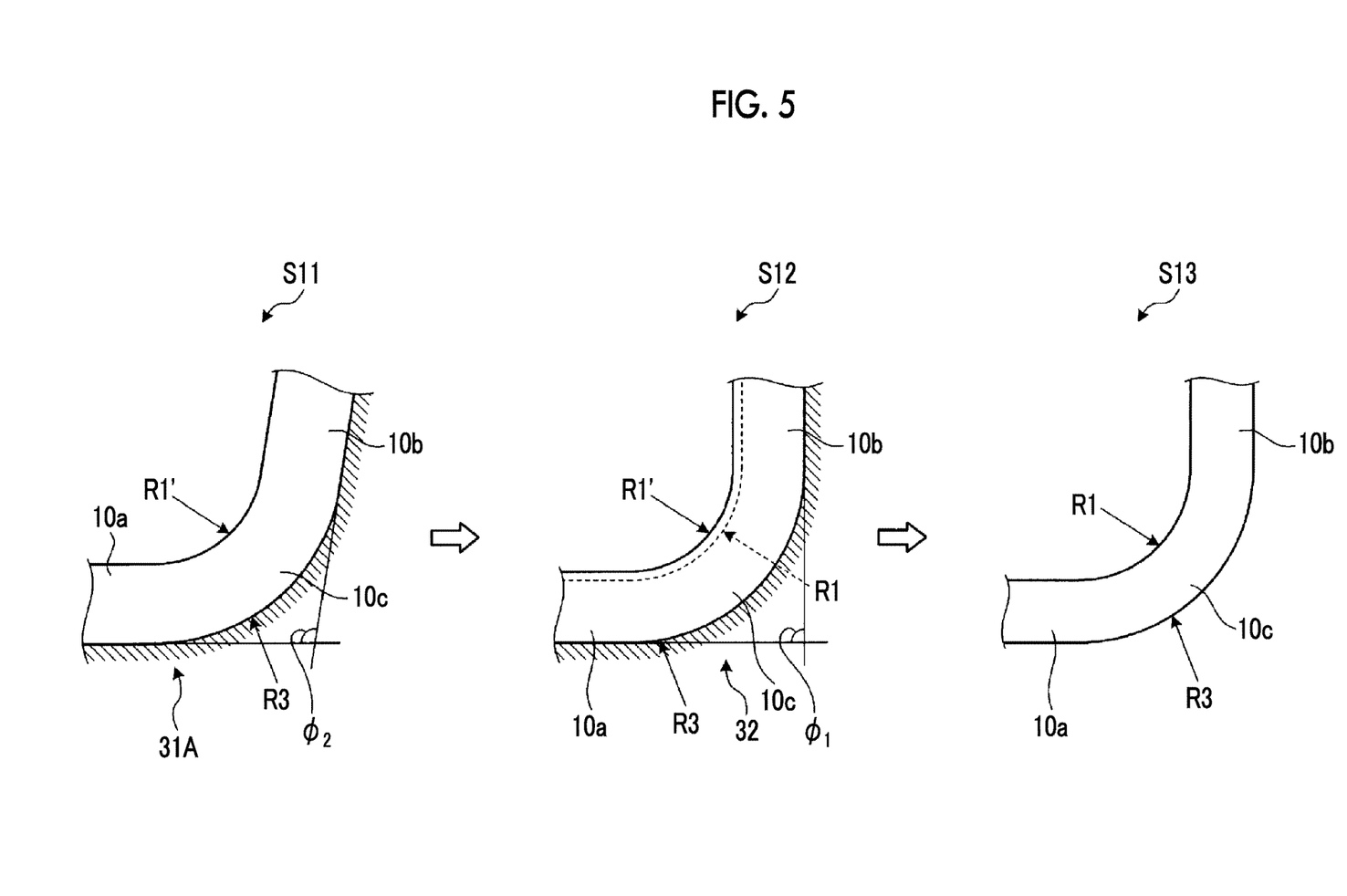
FIG. 5 is an explanatory diagram relating to a composite material molding method according to a second embodiment.

A composite material molding method according to a second embodiment will be described below with reference to FIG. 5. In the second embodiment, parts different from those of the first embodiment will be described and the same reference numerals will be used to refer to parts similar in configuration to those of the first embodiment so that duplicate descriptions are avoided. FIG. 5 is an explanatory diagram relating to the composite material molding method according to the second embodiment.

In the composite material molding method according to the second embodiment, a first molding tool 31A of a female mold is used in a first shaping step S11 and the second molding tool 32 of a female mold is used in a second shaping step S12. Description of the first molding tool 31A of the female mold will be omitted as the first molding tool 31A of the female mold is highly similar in configuration to the second molding tool 32 of the female mold.

As illustrated in FIG. 5, in the composite material molding method according to the second embodiment, the laminate 3 having the corner part 10c curved at the first bending angle $\varphi_2$ is molded first in accordance with the shape of the female mold material of the first molding tool 31A (Step S11: first shaping step). At this time, the first molding tool 31A is in contact with the outside of the corner part 10c of the laminate 3, and thus a change in the circumference of the outside of the corner part 10c is suppressed.

Subsequently, the corner part 10c of the laminate 3 is curved, such that the second bending angle (right angle) smaller than the first bending angle is formed, in accordance with the shape of the female mold material 51 of the second molding tool 32 by the laminate 3 forming the first bending angle being fitted into the female mold material 51 of the second molding tool 32 (Step S12: second shaping step). The second shaping step S12 is similar to the second shaping step S2 according to the first embodiment, and thus description thereof will be omitted.

In the second shaping step S12, the circumference of the inside of the laminate 3 is lengthened by the plate thickness of the laminate 3 being reduced from the curvature radius R1' to the curvature radius R1, and thus fiber elongation occurs. Accordingly, a surplus generated inside the corner part 10c in advance in the second shaping step S12 is offset by the fiber elongation in the second shaping step S2.

As described above, according to the second embodiment, a surplus part can be generated in advance inside the corner part 10c by the laminate 3 being curved to reach the second bending angle $\varphi_1$ from the first bending angle $\varphi_2$ in the second shaping step S12. In the second shaping step S12, the inside circumference of the corner part 10c can be suitably stretched, because of the surplus part, when the plate thickness of the laminate 3 is reduced from the inside toward the outside of the corner part 10c. Accordingly, fiber stretching inside the corner part 10c of the laminate 3 can be suppressed, densification of the corner part 10c can be suitably performed, and thus occurrence of imperfect molding of the corner part 10c can be suppressed.

REFERENCE SIGNS LIST

1 Composite material
3 Laminate
10 Spar
10a Central portion
10b Side surface portion
10c Corner part
30 Molding jig
31 First molding tool
32 Second molding tool
41 Male mold material
41a Upper surface portion
41b Side surface portion
41c Corner part
42 Bagging film
43 Seal material
44 Suction port
51 Female mold material
51a Bottom surface portion
51b Side surface portion
51c Corner part
51d Flange portion
52 Bagging film
53 Seal material
54 Suction port
$\varphi_2$ First bending angle
$\varphi_1$ Second bending angle

The invention claimed is:

1. A method for molding a composite material having a curved corner part, the composite material molding method comprising:
   a first shaping step of shaping and densifying a laminate having the corner part curved at a first bending angle and fiber sheets laminated using a first molding tool with which an inside of the corner part is in contact, such that a curvature radius of an outside of the corner part becomes shorter than the pre-densification by reducing a plate thickness of the laminate by applying pressure and heating the laminate from the outside toward the inside of the corner part; and
   a second shaping step of shaping and densifying the laminate by applying pressure and heating the laminate using a second molding tool such that the plate thickness of the laminate is reduced by curving the corner part of the laminate to be a second bending angle smaller than the first bending angle.

2. The composite material molding method according to claim 1,
   wherein the first molding tool is a male mold, and wherein the second molding tool is a female mold with which the outside of the corner part is in contact.

3. The composite material molding method according to claim 1,
wherein the composite material is a spar in which the corner part forms a right angle,
wherein the second bending angle is a right angle, and
wherein the first bending angle is an obtuse angle exceeding a right angle.

4. The composite material molding method according to claim 2, wherein
the laminate is shaped such that the plate thickness of the laminate is reduced from the inside toward the outside of the corner part in the second shaping step.

5. A method for molding a composite material having a curved corner part, the composite material molding method comprising:
a first shaping step of shaping and densifying a laminate having the corner part curved at a first bending angle and fiber sheets laminated by applying pressure and heating the laminate using a first molding tool such that a plate thickness of the laminate is reduced; and
a second shaping step of shaping and densifying the laminate using a second molding tool with which an outside of the corner part is in contact, such that a curvature radius of the inside of the corner part becomes longer than the pre-densification by reducing the plate thickness of the laminate by curving the corner part of the laminate to be a second bending angle smaller than the first bending angle by applying pressure and heating the laminate from the inside toward the outside of the corner part.

6. The composite material molding method according to claim 5,
wherein the first molding tool is a male mold with which an inside of the corner part is in contact, and
the second molding tool is a female mold.

7. The composite material molding method according to claim 6, wherein the laminate is shaped such that the plate thickness of the laminate is reduced from the outside toward the inside of the corner part in the first shaping step.

* * * * *